(12) United States Patent
Ishihara

(10) Patent No.: US 7,100,860 B2
(45) Date of Patent: Sep. 5, 2006

(54) RECORDING TAPE CARTRIDGE

(75) Inventor: Yusuke Ishihara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/446,703

(22) Filed: May 29, 2003

(65) Prior Publication Data
US 2003/0222168 A1 Dec. 4, 2003

(30) Foreign Application Priority Data
May 29, 2002 (JP) .............................. 2002-156423

(51) Int. Cl.
G11B 23/07 (2006.01)
(52) U.S. Cl. ...................... 242/348; 360/132
(58) Field of Classification Search ................ 242/348, 242/348.2; 360/132
See application file for complete search history.

(56) References Cited

U.S. PATENT DOCUMENTS

| 4,916,566 A | * | 4/1990 | Urayama ..................... 242/345 |
| 5,734,540 A | | 3/1998 | Jacobs et al. |
| 6,572,045 B1 | * | 6/2003 | Blair et al. ................. 242/337 |
| 2003/0001038 A1 | * | 1/2003 | Hiraguchi et al. .......... 242/348 |

* cited by examiner

Primary Examiner—John Q. Nguyen
(74) Attorney, Agent, or Firm—Sughrue Mion, PLLC

(57) ABSTRACT

A recording tape cartridge has: a case rotatably accommodating a reel on which a recording tape is wound; a reel area rib provided at an inner surface of the case, and defining a range in which the reel is accommodated; and a contact preventing mechanism which is provided at an inner surface of the case, is positioned in a reel hub forming the reel, and prevents contact between the reel area rib and the reel.

11 Claims, 4 Drawing Sheets

RECORDING TAPE CARTRIDGE

CROSS-REFERENCE TO RELATED APPLICATION

This application claims priority under 35 USC 119 from Japanese Patent Application No. 2002-156423, the disclosure of which is incorporated by reference herein.

BACKGROUND OF THE INVENTION

1. Field of the Invention

The present invention relates to a recording tape cartridge accommodating, within a case, a reel on which is wound a recording tape, such as a magnetic tape or the like, which is used as a recording/playback medium mainly for computers or the like.

2. Description of the Related Art

Conventionally, magnetic tape cartridges have been known in which a magnetic tape, which is used as a data recording/playback medium of a computer or the like, is wound on a single reel, and the reel is accommodated in a case A leader member, such as a leader pin, a leader tape, or a leader block, is provided at the distal end of the magnetic tape. A pull-out mechanism provided at a drive device pulls the leader member out from an opening of the magnetic tape cartridge, and winds the magnetic tape, which is fixed to the leader member, onto a take-up reel of the drive device.

A reel gear is formed in an annular form in the center of the bottom surface of a reel which emerges from an open hole formed in the bottom surface of the magnetic tape cartridge. Due to a driving gear, which is provided at a rotating shaft of the drive device, meshing with this reel gear, the reel is driven to rotate. By rotating the reel of the magnetic tape cartridge and the take-up reel of the drive device synchronously, data can be recorded onto the magnetic tape, and data recorded on the magnetic tape can be played back.

As shown in FIG. 4, reel area ribs 104, 106, which are arc-shaped, stand erect intermittently at an upper case 100 and a lower case 102. A reel 108, on which a magnetic tape (not shown) is wound, is rotatably accommodated at the inner sides of the reel area ribs 104, 106.

A clearance of about 0.5 mm is provided between, on the one hand, the reel area ribs 104, 106, and, on the other hand, an upper flange 114 and a lower flange 116 forming the reel 108, so as to compensate for dimensional errors caused by offset of the center or an error in inclination or the like of a magnetic tape cartridge 112 with respect to a drive device, when a driving gear (not shown) of the drive device meshes with a reel gear 110 provided at the reel 108. Movement of the reel 108 is restricted by the upper flange 114 or the lower flange 116 abutting the reel area rib 104 or the reel area rib 106, respectively.

However, when the magnetic tape cartridge 112 is dropped or the like, due to the impact at the time of the drop, the outer edge portion of the upper flange 114 or the lower flange 116 of the reel 108 hits the corner portion of the reel area rib 104 or the reel area rib 106 which stands upright intermittently. There is therefore the concern that the upper flange 114 or the lower flange 116 may deform, break, or the like.

SUMMARY OF THE INVENTION

In view of the aforementioned, an object of the present invention is to provide a recording tape cartridge in which an upper flange and a lower flange do not deform, break, or the like even when the recording tape cartridge receives impact due to a drop or the like.

A first aspect of the present invention provides a recording tape cartridge which comprises: a case rotatably accommodating a reel on which a recording tape is wound; a reel area rib provided at an inner surface of the case, and defining a range in which the reel is accommodated; and a contact preventing mechanism which is provided at an inner surface of the case, is positioned in a reel hub forming the reel, and prevents contact between the reel area rib and the reel.

Further, in the first aspect, the contact preventing mechanism may be formed from an abutment member which projects from an inner surface of the case, and the abutment member is disposed so as to be positioned in the reel hub.

In the above-described structure, the contact preventing mechanism is provided at the inner surface of the case, and is disposed in the reel hub, and prevents contact between the reel area ribs and the reel. In this way, even if the recording tape cartridge is dropped or the like, the flanges, which jut out from the both end portions of the reel hub, do not hit the reel area ribs. Thus, there is no possibility that the flanges will deform, break, or the like due to the flanges hitting the reel area ribs.

For example, an abutment member, which abuts the inner peripheral surface of the reel hub in a state in which a clearance is provided between the reel area rib and the outer edge portion of the flange of the reel, may be provided at the inner side of the reel area rib as the contact preventing mechanism.

In this way, when the recording tape cartridge is dropped or the like, due to the inner peripheral surface of the reel hub abutting the abutment member, movement of the reel is restricted, and the flanges do not hit the reel area ribs. Thus, the flanges do not hit the corner portions of the reel area ribs, and do not deform or break or the like.

Moreover, by providing the abutment member at regions of the case opposing the both end portions of the reel hub, when the recording tape cartridge is dropped or the like, tilting of the reel can be suppressed due to the inner peripheral surface of the reel hub abutting the abutment member. In this way, a structure can be realized in which the outer edge portions of the flanges do not hit the inner surface of the case.

In the first aspect of the present invention, there is a clearance $t_1$ between the abutment member and an inner surface of the reel hub when the abutment member is positioned in the reel hub, and the clearance $t_1$ is smaller than a clearance $t_2$ between the reel area rib and the reel.

Moreover, the abutment member may be formed by an annular rib.

Here, the abutment member is made to be an annular rib, and a clearance is provided between the outer peripheral surface of the annular rib and the inner peripheral surface of the reel hub. In this way, it is possible to compensate for dimensional errors due to offset of the center, an error in the inclination, or the like of the recording tape cartridge with respect to a drive device, at the time when the recording tape cartridge is loaded in the drive device.

A second aspect of the present invention provides a recording tape cartridge which comprises: a case rotatably accommodating a reel which has a reel hub and on which a recording tape is wound; a reel area rib provided at an inner surface of the case and defining a range in which the reel is accommodated; and a contact preventing mechanism provided between the case and the reel, wherein the contact preventing mechanism prevents contact between the reel area rib and the reel.

A third aspect of the present invention provides a method of manufacturing a recording tape cartridge, the tape cartridge having: a case which rotatably accommodates a reel which has a reel hub and on which a recording tape is wound, the case having a reel area rib which defines a range in which the reel is accommodated; and a contact preventing mechanism provided at an inner surface of the case, and preventing contact between the reel area rib and the reel, the method comprising the steps of: providing the contact preventing mechanism at an inner surface of the case in correspondence with both end portions of the reel hub; and disposing the contact preventing mechanism in the reel hub.

DETAILED DESCRIPTION OF THE INVENTION

Hereinafter, a recording tape cartridge relating to an embodiment of the present invention will be described.

Figure 1:
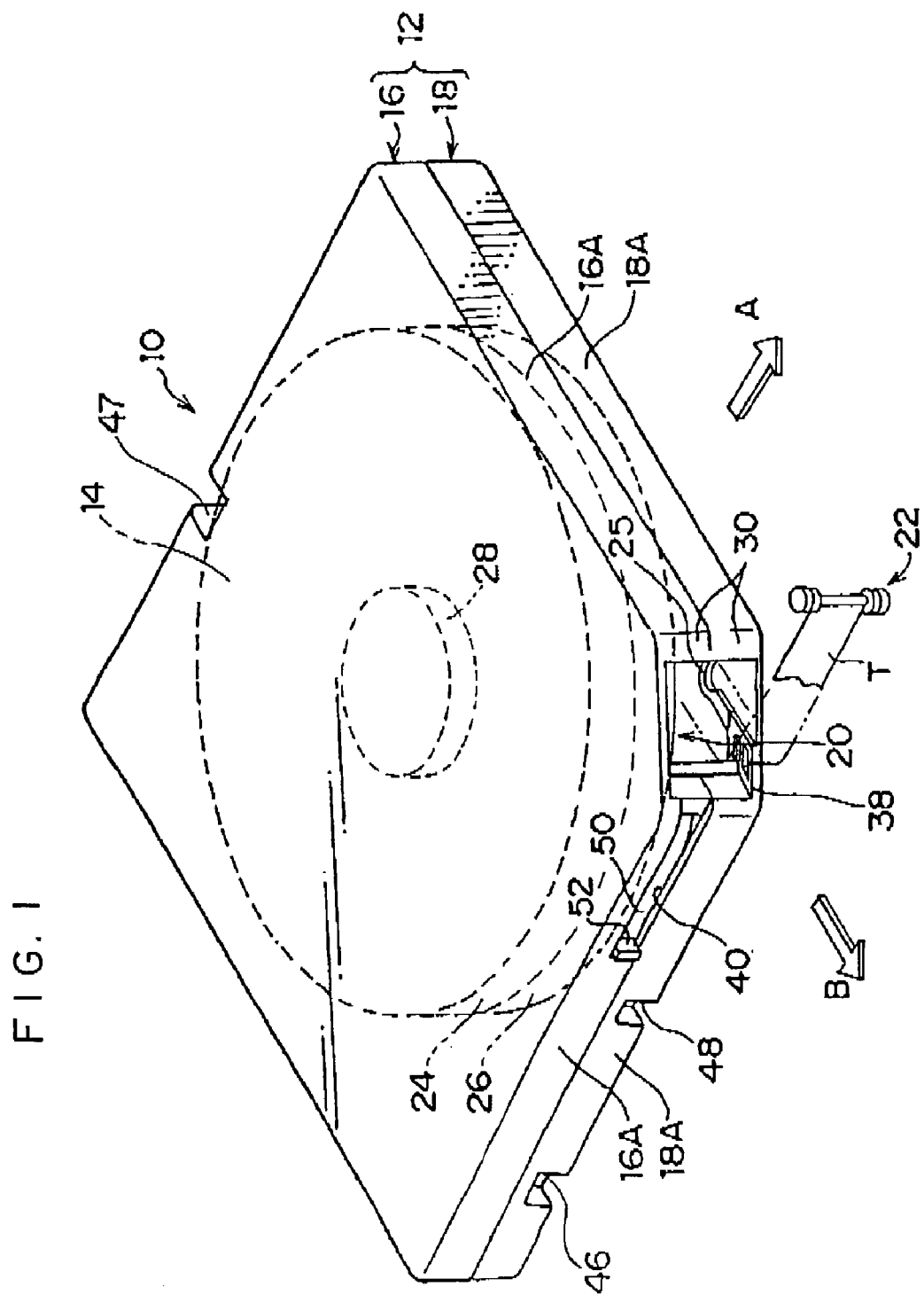
FIG. 1 is a perspective view showing an embodiment of a recording tape cartridge of the present invention.

Note that, for convenience of explanation, the direction of loading a magnetic tape cartridge 10 shown in FIG. 1 into a drive device (not shown) is denoted by arrow A, and this direction of arrow A is the forward direction of the recording tape cartridge 10. The front-back, left-right, and top-bottom directions are expressed on the basis of a case of looking in the direction of arrow A. The direction orthogonal to the loading direction is the direction of arrow B.

First, a summary of the overall structure relating to the embodiment of the present invention will be described.

Figure 2:
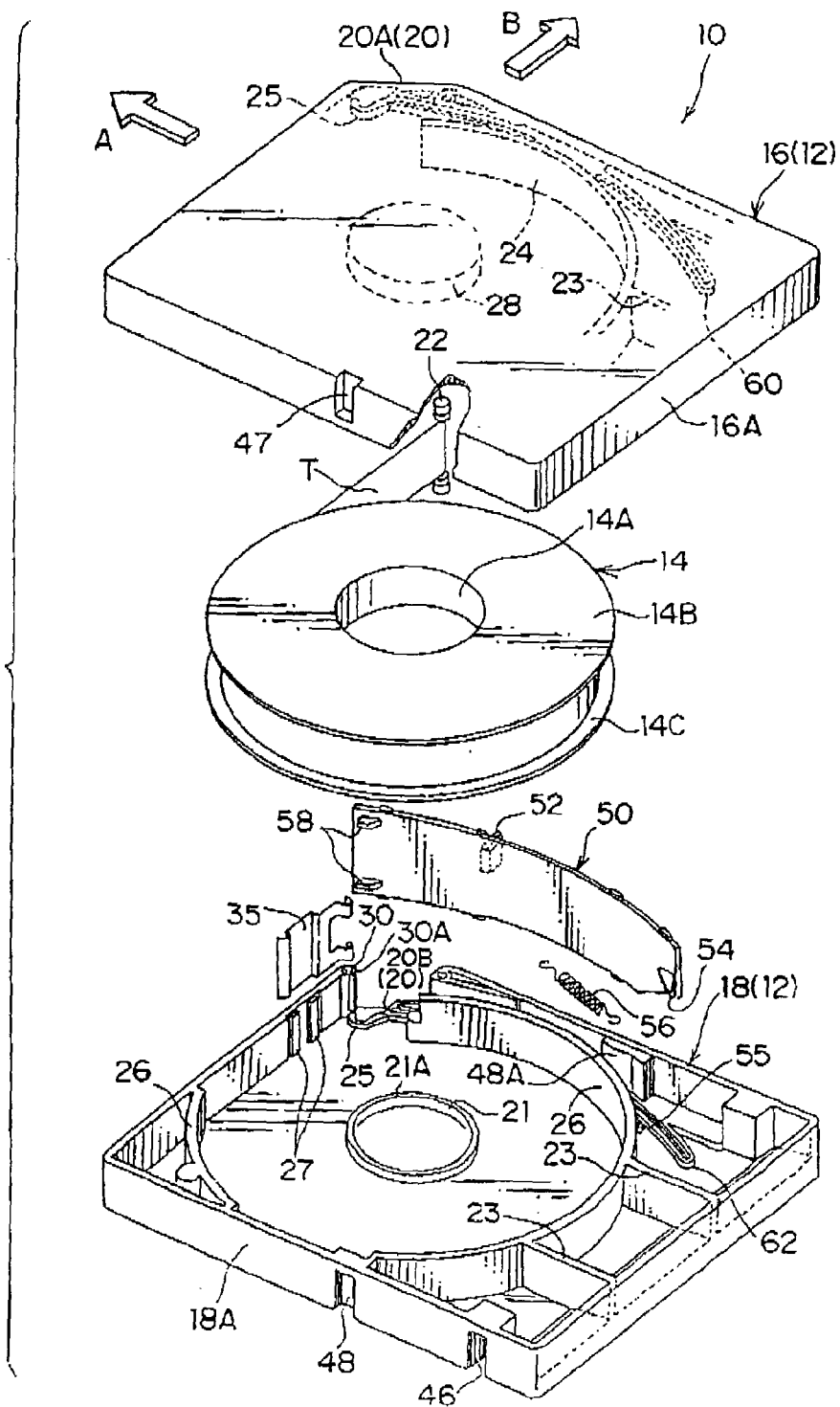
FIG. 2 is an exploded perspective view of the recording tape cartridge shown in FIG. 1.

As shown in FIGS. 1 and 2, the magnetic tape cartridge 10 has a case 12 which is substantially rectangular as seen in plan view. The case 12 is formed by fixing together, by unillustrated screws, an upper case 16 and a lower case 18 which are formed of synthetic resin, in a state in which peripheral walls 16A, 18A thereof abut one another.

A circular gear opening 21 is formed in the center of the bottom case 18. Reel area ribs 24, 26, which form circular arcs which are coaxial with the gear opening 21, stand erect at the inner surfaces of the upper case 16 and the lower case 18, respectively. A single reel 14, on which is wound a magnetic tape T serving as an information recording/playback medium, is rotatably accommodated at the inner sides of the reel area ribs 24, 26.

A plurality of reinforcing ribs 23 is provided between the reel area ribs 24, 26 and the peripheral walls 16A, 18A of the upper case 16 and the lower case 18. The reinforcing ribs 23 connect the reel area ribs 24, 26 and the peripheral walls 16A, 18A, respectively, and reinforce the reel area ribs 24, 26 and the peripheral walls 16A, 18A.

An annular rib 28, which is coaxial with the reel area rib 24, projects at the inner side of the reel area rib 24. The rib 28 is positioned within a reel hub 14A which forms the reel 14 which is accommodated at the inner sides of the reel area ribs 24, 26 (Description thereof will be given later).

At the reel 14, the cylindrical reel hub 14A around which the magnetic tape T is wound, and a lower flange 14C which juts out in the radial direction from the outer periphery of the bottom end of the reel hub 14A, are molded integrally of a synthetic resin. An upper flange 14B, which has the same configuration as the lower flange 14C, is joined to the top end of the reel hub 14A by ultrasonic welding or the like.

An annular reel gear 15 (see FIG. 3) is provided at the bottom surface of the reel 14, and emerges out from the gear opening 21 of the lower case 18. When the magnetic tape cartridge 10 is loaded into an unillustrated drive device and is disposed at a predetermined position, a driving gear, which forms a driving device provided at the drive device, passes through the gear opening 21 and meshes with the reel gear 15. In this way, driving force of the driving device is transmitted to the reel 14, and the reel 14 can rotate.

An annular rib 21A stands erect toward the inner surface side of the case 12, at the peripheral edge portion of the gear opening 21. The annular rib 21A is disposed coaxially with the annular rib 28 provided at the upper case 16. An annular groove 17 is provided at the outer side of the reel gear 15. The annular rib 21A is disposed in the annular groove 17, such that the reel 14 is positioned with respect to the lower case 18.

Cut portions 20A, 20B are formed at the front right corner portions of the upper case 16 and the lower case 16, respectively, of the magnetic tape cartridge 10. An opening 20 is formed by the cut portions 20A, 20B. A leader pin 22 and the magnetic tape T can pass through the opening 20.

A pair of upper and lower holder portions 25, which position and hold the leader pin 22 within the case 12, are provided at the inner side of the opening 20. The both end portions of the leader pin 22, which is in an upright state, are held by the holder portions 25.

Spring holding portions 27 are provided at the inner surface of the right side of the front wall of the peripheral wall 18A of the lower case 18. A plate spring 35 is inserted in and fixed at the base portions of the spring holding portions 27.

The plate spring 35 engages with the upper and lower end portions of the leader pin 22, and holds the leader pin 22 at the holder portions 25. When the leader pin 22 enters into and exits from the holder portions 25, the plate spring 35 elastically deforms appropriately so as to permit movement of the leader pin 22.

A pair of upper and lower short, inclined wall portions 30, which form the front edge portion of the opening 20, are provided at the inner surfaces of the right sides of the front walls of the peripheral walls 16A, 18A of the case 12. The inclined wall portions 30 are bent along the plane of opening of the opening 20, and are thicker than the peripheral walls 16A, 18A. Concave portions 30A are formed in the central portions, in the direction of thickness, of the inclined wall portions 30. The distal end of a door 50, which opens and closes the opening 20, can engage with the concave portions 30A.

The door 50 is curved along its own longitudinal direction. The door 50 can slide smoothly within and along guide walls 60, 62 which are arc-shaped, are provided at the upper case 16 and the lower case 18, and are formed so as to have substantially the same radius of curvature as that of the door 50.

An operation projection 52 projects at the outer surface side of the door 50. The operation projection 52 can be exposed from a slit 40 which is formed in the front portion of the right wall of the peripheral wall 16A of the upper case 16 and which communicates the interior and the exterior of the case 12. The door 50 can be opened and closed via the operation projection 52.

A spring holding portion 54 projects at the rear end of the door 50. One end portion of a coil spring 56 is anchored on and held at the spring holding portion 54. The other end portion of the coil spring 56 is anchored on a spring anchor portion 55 provided in a vicinity of the outer peripheral surface of the reel area rib 26 of the lower case 18. In this way, the door 50 is always urged in the direction of closing the opening 20 due to the urging force of the coil spring 56, and usually closes the opening 20.

Further, stoppers 58, which abut the upper end portion side surface and the lower end portion side surface of the leader pin 22 when the opening 20 is closed, project at the inner surface of the front end portion of the door 50. The stoppers 58 prevent the leader pin 22 from falling out from the holder portions 25 due to impact at the time the magnetic tape cartridge 10 is dropped or the like.

Concave portions 46, 48, which are recessed toward the inner side of the peripheral wall 18A such that the cross-sections thereof are substantially U-shaped, are formed in the left and right walls of the peripheral wall 18A of the lower case 18 except for the top end portion of the peripheral wall 18A.

A grasping mechanism of an unillustrated library device can engage with the concave portions 46. This grasping mechanism engages the concave portions 46, and loads the magnetic tape cartridge 10 into the library device. On the other hand, a grasping mechanism of a drive device (not shown) can engage with the concave portions 48. This grasping mechanism engages with the concave portions 48, and loads the magnetic tape cartridge 10 into the drive device.

The torsional strength of the case 12 is improved by providing the concave portions 46, 48. Moreover, the inner surface portion of the peripheral wall 18A which prescribes the concave portion 48 is curved in accordance with the outer surface of the door 50, and forms a guide surface 48A for preventing chattering of the door 50 which slides at the time of opening and closing the opening 20.

In the present embodiment, a grasping mechanism of a library device engages the concave portions 46, and a grasping mechanism of a drive device engages the concave portions 48. However, the grasping mechanism of a drive device may engage the concave portions 46, and the grasping mechanism of a library device may engage the concave portions 48.

Concave portions 47 are formed in the left and right walls of the peripheral wall 16A of the upper case 16, at portions corresponding to the concave portions 48 provided at the lower case 18. The concave portions 47 are engagement portions which a holding member engages in order to cancel the rotational moment accompanying movement of the door 50 in the opening direction at the time of opening the opening 20.

In accordance with the above-described structure, at the time when the magnetic tape T is to be used, when the magnetic tape cartridge 10 is loaded into an unillustrated drive device along the direction of arrow A, an engaging member of the drive device engages with the operation projection 52 exposed from the slit 40, and moves the door 50 in a direction against the urging force of the coil spring 56, and opens the opening 20.

In the state in which the door 50 is completely opened, the magnetic tape cartridge 10 is positioned within the drive device. Then, a pull-out mechanism of the drive device enters into the case 12 from the opening 20 which has been opened. The pull-out mechanism pulls out the leader pin 22 which is positioned and held by the holder portions 25, and accommodates the leader pin 22 at an unillustrated take-up reel.

Due to the take-up reel and the reel 14 being driven to rotate synchronously, the magnetic tape T is successively pulled-out from the case 12 while being taken-up onto the take-up reel. Information is recorded or played back by a recording/playback head or the like of the drive device, which recording/playback head is disposed along a predetermined tape path.

On the other hand, when the magnetic tape T is rewound onto the reel 14 and the magnetic tape cartridge 10 is to be ejected from the drive device, the positioned state of the magnetic tape cartridge 10 is released, and the magnetic tape cartridge 10 is moved in the direction opposite to the direction of arrow A by an unillustrated ejecting mechanism of the drive device.

At this time, the engaging member of the drive device which engages with the operation projection 52 provided at the door 50 is withdrawn, and the door 50 moves in the direction of closing the opening 20 due to the urging force of the coil spring 56. The distal end portion of the door 50 enters into the concave portions 30A of the inclined wall portions 30, and the opening 20 is in a completely closed state.

Next, operation of the recording tape cartridge relating to the present embodiment will be described.

Figure 3:
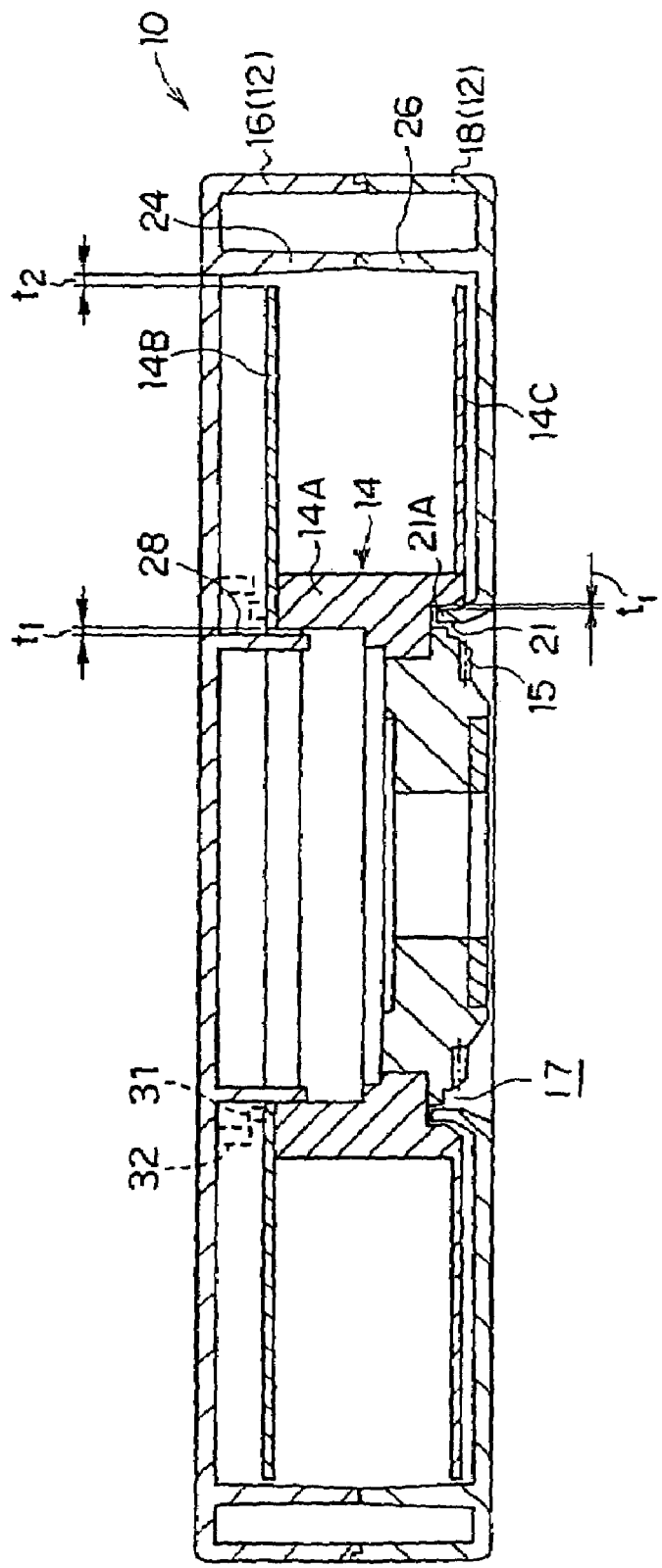
FIG. 3 is a schematic sectional view of the recording tape cartridge shown in FIG. 1.
Figure 4:
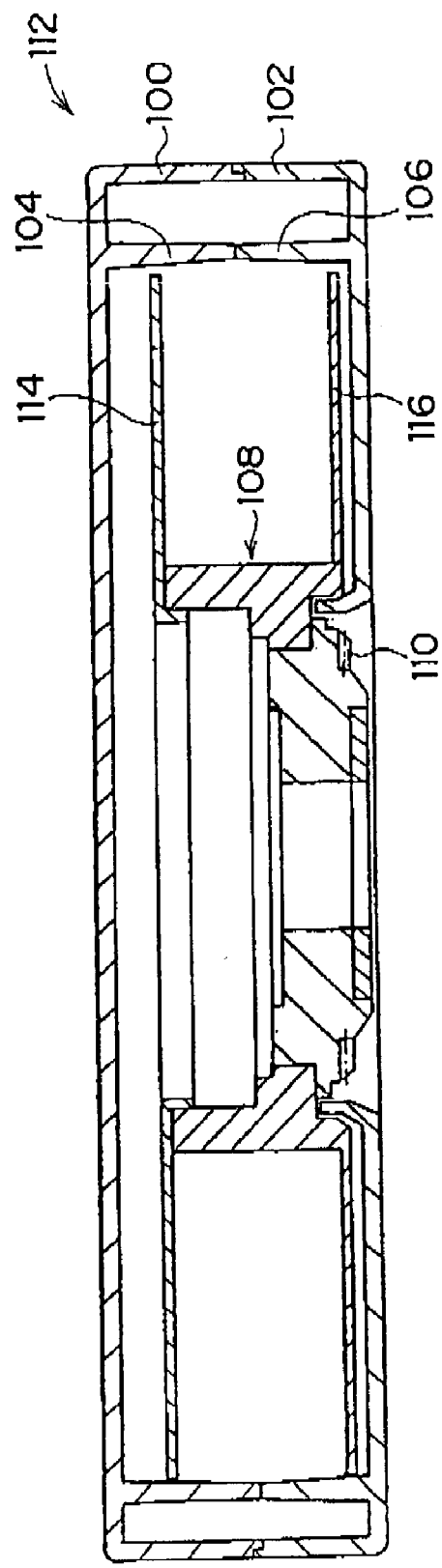
FIG. 4 is a schematic sectional view of a conventional recording tape cartridge.

As shown in FIG. 3, the annular rib 28, which serves as a contact preventing mechanism, projects at the inner side of the reel area rib 24 which stands erect at the inner side of the upper case 16. The annular rib 28 is provided coaxially with the reel area rib 24, and is disposed at the inner side of the reel hub 14A forming the reel 14.

The inner peripheral surface of the reel hub 14A and the outer peripheral surface of the annular rib 28 can abut one another. In the state in which the inner peripheral surface of the reel hub 14A and the outer peripheral surface of the annular rib 28 abut one another, a clearance $t_2$ is provided between, on the one hand, the reel area ribs 24, 26, and, on the other hand, the upper flange 14B and the lower flange 14C which form the reel 14.

When the driving gear of the drive device meshes with the reel gear 15 provided at the reel 14, offset of the center, an error in inclination, or the like of the magnetic tape cartridge 10 with respect to the drive device arises. Thus, in order to compensate for this dimensional error, a clearance $t_1$ (e.g., about 0.5 mm) is provided between the inner peripheral surface of the reel hub 14A and the outer peripheral surface of the annular rib 28.

Accordingly, the clearance $t_2$ provided between the reel area ribs 24, 26 and the upper flange 14B and the lower flange 14C is greater than the clearance $t_1$ provided between the inner peripheral surface of the reel hub 14A and the outer peripheral surface of the annular rib 28 ($t_2 > t_1$).

By providing the clearance $t_2$ between the reel area ribs 24, 26 and the upper flange 14B and the lower flange 14C in the state in which the inner peripheral surface of the reel hub 14A and the outer peripheral surface of the annular rib 28 abut one another, when the magnetic tape cartridge 10 is dropped or the like, the inner peripheral surface of the reel hub 14A abuts the annular rib 28, and movement of the reel 14 in the horizontal direction is restricted.

In this way, contact between the reel area ribs 24, 26 and the outer edge portions of the upper flange 14B and the lower flange 14C is prevented, and the upper flange 14B and the lower flange 14C do not hit the corner portions of the reel area ribs 24, 26 which are intermittent. Accordingly, there is no possibility of deformation, breakage or the like of the upper flange 14B and the lower flange 14C, which could arise due to the upper flange 14B or the lower flange 14C hitting the corner portions of the reel area ribs 24, 26.

The annular rib 21A stands erect toward the inner surface side of the case 12, at the peripheral edge portion of the gear opening 21 provided at the central portion of the lower case 18. The annular rib 21A is disposed coaxially with the annular rib 28 provided at the upper case 16. On the other hand, the annular groove 17 is provided at the outer side of the reel gear 15. The annular rib 21A is disposed within the annular groove 17. The clearance provided between the inner peripheral surface of the reel hub 14A and the outer peripheral surface of the annular rib 21A is $t_1$.

In this way, when the magnetic tape cartridge 10 is dropped or the like, even if the reel 14 tilts, titling of the reel 14 can be suppressed by the inner peripheral surface of the reel hub 14A abutting the annular ribs 28, 21A. Namely, the annular rib 21A functions in the same way as the annular rib 28. In this way, it is possible for the outer edge portions of the upper flange 14B and the lower flange 14C to not abut the inner surface of the case 12.

Note that, in the present embodiment, the annular rib 28 is used as the contact preventing mechanism. However, it suffices for the reel flange 14A to be abutted and for movement of the reel 14 to be restricted. Therefore, the contact preventing mechanism may be structured by providing, in an annular arrangement, a plurality of projections which is disposed at predetermined intervals. The contact preventing mechanism does not have to be the annular rib 28. For example, a plurality of ribs or projections which extend radially from the center of the upper case 16 may be used.

Moreover, in the present embodiment, the annular ribs 21A and 28, which serve as the contact preventing mechanism, are provided at the lower case 18 and the upper case 16 respectively, and are positioned within the reel hub 14A. However, as the contact preventing mechanism, convex portions 31 may be provided at the peripheral edges of the reel hub 14A coaxially with the reel 14, and concave portions 32, in which the convex portions provided at the reel 14 are rotatably accommodated, may be provided at the upper case 16 and the lower case 18 (as also shown in FIG. 3). Namely, at least one of the annular ribs 21A and 28 (i.e. element 31) may be provided at the reel 14, and a concave portion 32, in which the annular rib 21A and/or 28 is accommodated, may be provided at a region of the upper case 16 and/or the lower case 18 corresponding to the annular rib 21A and/or 28 which is provided at the reel 14.

Moreover, in the present embodiment, the leader pin 22 is used as the leader member as shown in FIG. 1. However, the present invention is not limited to the same, and a leader block, a leader tape, or the like may be used.

The door 50 is urged in the closing direction by using the coil spring 56. However, it suffices for the door 50 to be urged in the closing direction when the magnetic tape cartridge 10 is not in use. Thus, the present invention is not limited to use of the coil spring 56. Therefore, an urging mechanism such as a plate spring or the like may be used, and the present invention is not limited to the structure of the present embodiment.

In addition, the present embodiment is an example applied to the recording tape cartridge 10 in which the single reel 14 is rotatably accommodated in the case 12. However, the present invention is not limited to the same, and may be applied, for example, to a recording tape cartridge having two reels such as for a video tape or the like.

Although the magnetic tape T was used as the recording tape, the present invention is not limited to the same. It suffices for the recording tape to be interpreted as an information recording/playback medium on which information can be recorded and from which recorded information can be played back. It goes without saying that the recording tape cartridge relating to the present invention can be applied to recording tapes of any recording/playback systems.

Because the present invention has the above-described structure, even if the recording tape cartridge is dropped or the like, the flanges jutting out from both end portions of the reel hub do not hit the reel area ribs. Thus, there is no concern that the flanges of the reel might deform, break, or the like due to the flanges hitting the reel area ribs.

What is claimed is:

1. A recording tape cartridge comprising:
   a case rotatably accommodating a reel on which a recording tape is wound;
   a reel area rib provided at an inner surface of the case, and defining a range in which the reel is accommodated; and
   a contact preventing mechanism which is provided at an inner surface of the case, is positioned in a reel hub forming the reel, and prevents contact between the reel area rib and the reel,
   wherein the contact preventing mechanism is formed from an abutment member which projects from said inner surface of the case, and the abutment member is disposed so as to be positioned in the reel hub,
   wherein there is a clearance t1 between the abutment member and an inner surface of the reel hub when the abutment member is positioned in the reel hub, and the clearance t1 is smaller than a clearance t2 between the reel area rib and the reel,
   wherein the case is formed from an upper case and a lower case, and the contact preventing mechanism is provided at the upper case and at the lower case, and
   wherein a clearance between an abutment member of the upper case and the inner surface of the reel hub is equal to said clearance t1 and is substantially equal to a clearance between an abutment member of the lower case and the inner surface of the reel hub, and said clearance t1 is maintained along the entire circumference of the inner surface of the reel hub at the upper and lower portions thereof.

2. The recording tape cartridge of claim 1, wherein the case is formed from an upper case and a lower case, and the contact preventing mechanism is provided at the upper case and at the lower case.

3. The recording tape cartridge of claim 1, wherein the abutment member is formed by an annular rib.

4. A recording tape cartridge comprising:
   a case rotatably accommodating a reel which has a reel hub and on which a recording tape is wound;
   a reel area rib provided at an inner surface of the case and defining a range in which the reel is accommodated; and
   a contact preventing mechanism provided between the case and the reel,
   wherein the contact preventing mechanism prevents contact between the reel area rib and the reel, wherein the contact preventing mechanism is formed from a concave portion and a convex portion, and the convex portion is rotatably accommodated in the concave portion, wherein the case is formed from an upper case and a lower case, and the convex portion is provided at the lower case and at the upper case, and the concave portion is provided at a region of the reel which region corresponds to the convex portion provided at the lower case, and is provided at the upper case in correspondence with the convex portion provided at the upper case, and a clearance between the convex portion at the lower case and an inner surface of the concave portion, when the convex portion at the lower case is positioned in the concave portion, is substantially equal to a clearance between the convex portion at the upper case and an inner surface of the concave portion, when the convex portion at the upper case is positioned in the concave portion, and wherein each of the clearances are maintained along an entire circumference of the inner surface of the concave portion with respect to the upper and lower cases thereof.

5. The recording tape cartridge of claim 4, wherein the concave portion is the reel hub of the reel, and a plurality of the convex portions are provided at the case so as to correspond to both axial end portions of the reel hub.

6. The recording tape cartridge of claim 5, wherein
the contact preventing mechanism is formed from an abutment member which projects from said inner surface of the case, and the abutment member is disposed so as to be positioned in the reel hub, and
there is a clearance t1 between the abutment member and an inner surface of the reel hub when the abutment member is positioned in the reel hub, and the clearance t1 is smaller than a clearance t2 between the reel area rib and the reel.

7. The recording tape cartridge of claim 4, wherein the concave portion provided at the reel is the reel hub of the reel.

8. The recording tape cartridge according to claim 7, wherein
the contact preventing mechanism is formed from an abutment member which projects from said inner surface of the case, and the abutment member is disposed so as to be positioned in the reel hub, and
there is a clearance t1 between the abutment member and an inner surface of the reel hub when the abutment member is positioned in the reel hub, and the clearance t1 is smaller than a clearance t2 between the reel area rib and the reel.

9. A recording tape cartridge according to claim 4, wherein
the contact preventing mechanism is formed from an abutment member which projects from said inner surface of the case, and the abutment member is disposed so as to be positioned in the reel hub, and
there is a clearance t1 between the abutment member and an inner surface of the reel hub when the abutment member is positioned in the reel hub, and the clearance t1 is smaller than a clearance t2 between the reel area rib and the reel.

10. A method of manufacturing a recording tape cartridge, the tape cartridge having: a case which rotatably accommodates a reel which has a reel hub and on which a recording tape is wound, the case having a reel area rib which defines a range in which the reel is accommodated; and a contact preventing mechanism provided at an inner surface of the case, and preventing contact between the reel area rib and the reel, said method comprising the steps of:
a. providing the contact preventing mechanism at an inner surface of the case in correspondence with both axial end portions of the reel hub; and
b. disposing the contact preventing mechanism in the reel hub,
wherein a clearance t1 between the contact preventing mechanism and an inner surface of the reel hub is smaller than a clearance t2 between the reel area rib and the reel,
wherein the contact preventing mechanism is formed from an abutment member which projects from said inner surface of the case,
wherein the case is formed from an upper case and a lower case, and the contact preventing mechanism is provided at the upper case and at the lower case, and
wherein a clearance between an abutment member of the upper case and the inner surface of the reel hub is equal to said clearance t1 and is substantially equal to a clearance between an abutment member of the lower case and the inner surface of the reel hub, and said clearance t1 is maintained along the entire circumference of the inner surface of the reel hub at the upper and lower portions thereof.

11. The method according to claim 10, wherein
the contact preventing mechanism is formed from a concave portion and a convex portion, and the convex portion is rotatably accommodated in the concave portion,
the case is formed from an upper case and a lower case, and the convex portion is provided at the lower case and at a surface of the reel which surface opposes the upper case, and the concave portion is provided at a region of the reel which region corresponds to the convex portion provided at the lower case, and is provided at the upper case in correspondence with the convex portion provided at the reel.

* * * * *